(12) United States Patent
Massimiani (10) Patent No.: US 10,658,917 B2
(45) Date of Patent: May 19, 2020

(54) SYNCHRONOUS RECTIFICATION CIRCUIT, CORRESPONDING DEVICE AND METHOD

(71) Applicant: STMicroelectronics S.r.l., Agrate Brianza (IT)

(72) Inventor: Ivan Clemente Massimiani, Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 0 days.

(21) Appl. No.: 16/371,489

(22) Filed: Apr. 1, 2019

(65) Prior Publication Data

US 2019/0326808 A1    Oct. 24, 2019

(30) Foreign Application Priority Data

Apr. 20, 2018   (IT) .................. 102018000004743

(51) Int. Cl.
| | |
|---|---|
| *H02M 1/08* | (2006.01) |
| *H02M 7/06* | (2006.01) |
| *H02M 7/217* | (2006.01) |
| *H02M 1/00* | (2006.01) |
| *H02M 3/335* | (2006.01) |

(52) U.S. Cl.
CPC .............. *H02M 1/08* (2013.01); *H02M 7/06* (2013.01); *H02M 7/217* (2013.01); *H02M 3/33592* (2013.01); *H02M 2001/0048* (2013.01)

(58) Field of Classification Search
CPC .... H02M 3/33592; H02M 1/08; H02M 7/217; H02M 7/06; H02M 2001/0048; H02M 2001/0051
See application file for complete search history.

(56) References Cited

U.S. PATENT DOCUMENTS

| | | | | |
|---|---|---|---|---|
| 6,055,170 | A  * | 4/2000 | Yee ...................... | H02M 3/1588 363/127 |
| 2010/0118565 | A1* | 5/2010 | Stuler ............... | H02M 3/33592 363/21.08 |
| 2011/0096578 | A1 | 4/2011 | Fang et al. | |
| 2012/0020123 | A1* | 1/2012 | Hsu .......................... | H02M 1/32 363/21.14 |
| 2013/0063985 | A1* | 3/2013 | Ye ........................... | H02M 1/38 363/21.05 |
| 2014/0192575 | A1* | 7/2014 | Olivik ............... | H02M 3/33592 363/89 |
| 2015/0049521 | A1 | 2/2015 | Iorio et al. | |
| 2016/0294298 | A1 | 10/2016 | Wong et al. | |
| 2019/0229634 | A1* | 7/2019 | Moon ................... | H02M 1/083 |

* cited by examiner

*Primary Examiner* — Kyle J Moody
(74) *Attorney, Agent, or Firm* — Slater Matsil, LLP (57) ABSTRACT

A sense terminal is configured to sense a drain-to-source voltage of a field effect transistor and a drive terminal is configured to drive the gate terminal of the field effect transistor to alternatively turn the field effect transistor on and off to provide a rectified current flow in the field effect transistor channel. A comparator is configured to perform a comparison of the drain-to-source voltage of the field effect transistor with a reference threshold and to detect alternate downward and upward crossings of the reference threshold and the drain-to-source voltage. A PWM signal generator is configured to drive the gate terminal of the field effect transistor to turn the field effect transistor on and off as a result of the alternate downward and upward crossings of the reference threshold by the drain-to-source voltage.

29 Claims, 6 Drawing Sheets

COMPARATOR CIRCUIT

FIRST COMPARATOR
701

SECOND COMPARATOR
702

FIG. 7

COMPARATOR CIRCUIT

FIRST COMPARATOR
801

SECOND COMPARATOR
802

FIG. 8

SYNCHRONOUS RECTIFICATION CIRCUIT, CORRESPONDING DEVICE AND METHOD

CROSS-REFERENCE TO RELATED APPLICATIONS

This application claims priority to Italian Patent Application No. 102018000004743, filed on Apr. 20, 2018, which application is hereby incorporated herein by reference.

TECHNICAL FIELD

The description relates to a synchronous rectification circuit, as well as a corresponding device and method.

BACKGROUND

In various power conversion systems, such as AC/DC and DC/DC converters, field effect transistors or FETs (MOSFET transistors, for instance) driven by control logic can replace rectifier diodes.

This technique, oftentimes referred to as synchronous rectification (SR), is found to improve converter efficiency. Resorting to SR facilitates reducing conduction losses insofar as the (rectified) output current flows through the MOSFET channel instead of the rectification diode, with power losses correspondingly reduced.

Such a power converter continues to operate also if a synchronous rectification FET is not driven. This is because rectification is still provided by an internal body diode (essentially body-to-drain, with body-to-source being irrelevant insofar as this is shorted out by an internal body-to-source connection).

The body diode (which is intrinsic to most FET types) may however exhibit poor performance: properly driving a (MOS)FET, when the body diode is forward biased, may increase system efficiency by about 3%-4%.

SUMMARY

Despite the intensive activity in that area, further improved solutions are desirable. Embodiments can contribute in providing such improved solutions.

The description relates to synchronous rectification. One or more embodiments can be applied, for instance, to a variety of AC/DC and DC/DC converters. Converters for use in battery chargers for electronic devices, USB power delivery (USB-PD) arrangements, adapters are non-limiting examples of such applications.

One or more embodiments may relate to a corresponding device, e.g., a MOSFET-based synchronous rectifier in a battery charger for electronic devices, a USB power delivery (USB-PD) arrangement an adapter and so on.

One or more embodiments may relate to a corresponding method.

One or more embodiments may be based on the recognition that, while suited to be implemented with analog components (for instance dedicated ICs), synchronous rectification implemented in digital form facilitates reducing the number of components, achieving improved flexibility in devising control procedures and a higher tolerance to noise.

One or more embodiments may provide adaptive synchronous (SR) implementation.

One or more embodiments may be implemented with a microcontroller (such as, for instance, an STM32 microcontroller as available with companies of the ST group) by using only the internal peripherals therein.

In one or more embodiments, an (internal) comparator may trigger a timer which in turn generates a pulse-width modulation (PWM) signal. The comparator can be reconfigured on-the-fly by a direct memory access (DMA) channel to trigger PWM shut-down (otherwise a second internal comparator can be used). An analog-to-digital converter (ADC) channel can be used to sample the drain-to-source voltage Vds of the (MOS)FET after PWM turn-off, then the synchronous rectification (SR) control logic can change the comparator threshold by using, for instance, a digital-to-analog converter or DAC channel.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

As noted, in various power conversion systems, such as AC/DC and DC/DC converters, field effect transistors, namely FETs (MOSFET transistors, for instance) driven by control logic can replace rectifier diodes. This technique, oftentimes referred to as synchronous rectification (SR) is found to improve converter efficiency.

Figure 1A:
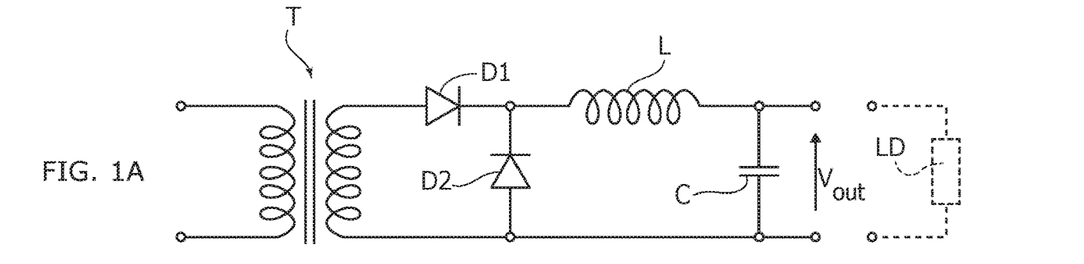
FIG. 1 comprises two portions, FIGS. 1A and 1B, and is representative of the possible replacement of diode rectification with synchronous rectification by means of field effect transistors (FETs) such a MOSFETs.
Figure 1B:
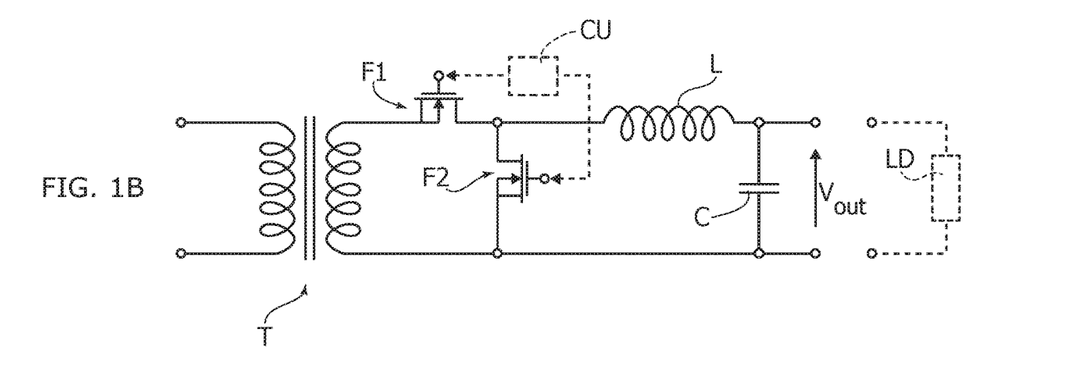

The FIGS. 1A and 1B are exemplary of the possibility of replacing one or more rectification diodes (for instance two rectification diodes D1, D2 in FIG. 1A) with respective corresponding FETs (MOSFET transistors, for instance) F1 and F2 in FIG. 1B within the framework of a rectifier circuit.

This may occur, for instance, at the secondary side of a transformer T, with the MOSFET transistors F1 and F2 alternatively turned on (that is, made conductive) and off (that is, made non-conductive) under the control of a control unit CU so that a (rectified) current may flow in channels of the MOSFET transistors F1 and F2.

The rectifier circuit architecture in FIG. 1 includes two diodes D1, D2 (FIG. 1A) or two MOSFET transistors F1, F2 (FIG. 1B) coupled to the secondary winding of a transformer T and having cascaded thereto a RC low pass filter suited to provide a (rectified) voltage signal $V_{out}$ to a load L.

It will be appreciated that the rectifier circuit architecture in FIG. 1 is just exemplary of a wide variety of rectifier circuits to which SR can be applied. Therefore, the circuit architecture of FIG. 1 is not to be construed, even indirectly, as confining the scope of the embodiments.

Figure 2:
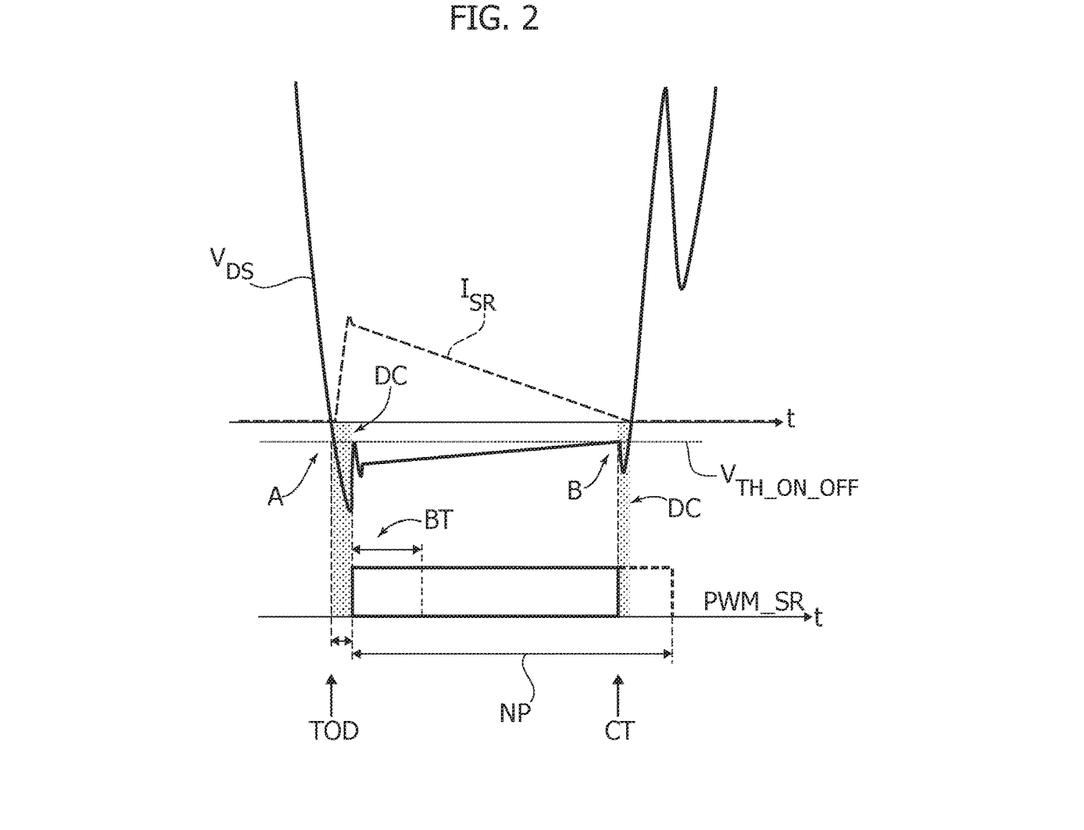
FIG. 2 is a time diagram exemplary of certain signals possibly involved in synchronous rectification with FETs.

One or more embodiments may comprise (digital) controller circuits suited to be coupled to field effect transistors (for instance, F1 and F2 in FIG. 2).

A conventional field effect transistor (FET) such as, for instance, a MOSFET comprises a channel between source and drain terminals as well as a body diode and a gate terminal configured to control electrical current flow in the field effect transistor channel.

As noted, by resorting to SR, conduction losses can be reduced thanks to the output current $I_{out}$ flowing through a (MOS)FET channel instead of a rectification diode, so that the power loss is decreased from $P_{loss\_diode}=V_d \cdot I_{out}$ (where $V_d$ is the voltage drop across the diode) to $P_{loss\_MOSFET}=R_{ds\_on} \cdot I_{out}^2$ (where $R_{ds\_on}$ is the drain-source resistance in the "on" or conductive state) which may be (very) low for SR MOSFETs.

As similarly noted, such a power converter continues to operate also if a synchronous rectification FET is not driven. This is because rectification is still provided by an internal body diode, which, however, may exhibit poor performance: properly driving such a MOSFET when the body diode is forward biased may increase system efficiency by about 3%-4%.

A problem underlying synchronous rectification (SR) using FETs (MOSFETs will be primarily referred to in the following for simplicity) is detecting the MOSFET body diode conduction in order to be able to turn-off the MOSFET channel in a fast and reliable way, thus avoiding current inversion, which may cause MOSFET failure.

This may apply, for instance, to those systems where a digital controller has no prior information about diode conduction (e.g., because the power converter is driven by another IC). To increase the efficiency of the system, a control logic should desirably be able to reduce progressively the conduction times of the MOSFET body diode, for instance via adaptive SR driving.

It is observed that digital solutions can be conceived where the drain-source voltage $V_{DS}$ of a SR MOSFET can be sensed to detect body diode conduction by using additional hardware (i.e., comparators, etc.) to measure the conduction time. Based on this measure, the duration of the PWM "on" time can be adjusted to avoid a fast turn-off mechanism if the diode conduction time changes abruptly. Such an implementation can be resorted to, for instance, in those topologies (e.g., LLC converters) where the turn-on time may be already known to the digital controller.

One or more embodiments may rely on a MOSFET turn-on and turn-off mechanism where (only) internal resources of a digital controller may be used to detect the start and the end of conduction of the body diode of a FET such as a MOSFET and drive the FET consequently. This may facilitate performing an adaptive SR algorithm which increases the efficiency of the converter in a simple and reliable way.

As exemplified in the diagram of FIG. 2, the drain-source voltage $V_{DS}$ voltage (possibly conditioned—e.g., converted to digital—as desired, in manner known per se) can be sensed and sent to an comparator (e.g., internal to the controller CD) and compared to a threshold $V_{TH\_ON\_OFF}$, set by the controller.

Figure 3:
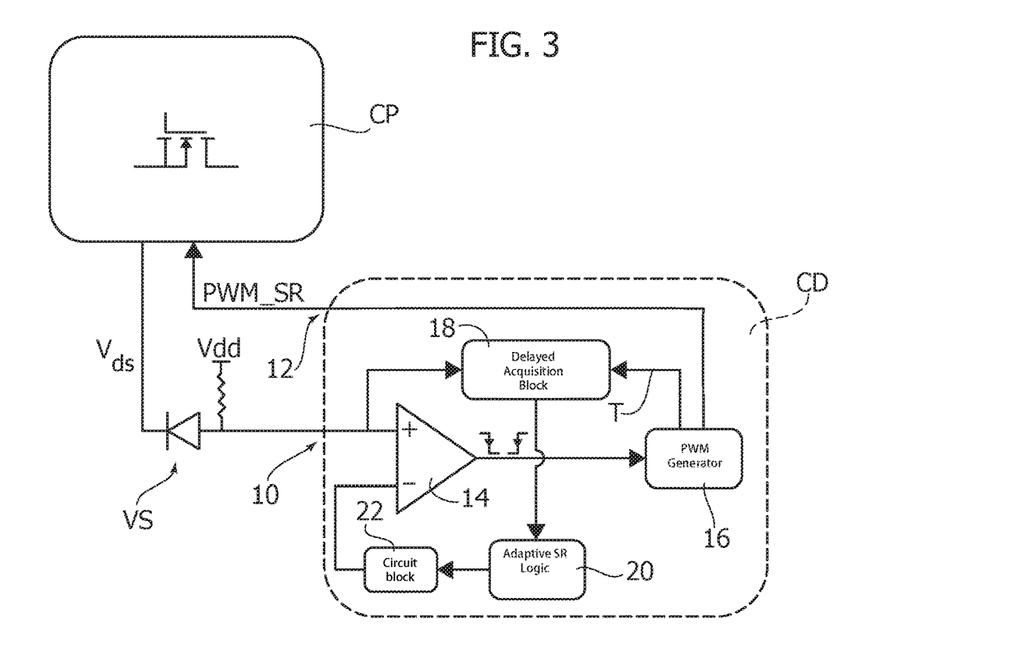
FIG. 3 is a block diagram exemplary of a possible context of use of embodiments.

This may occur within the framework of a circuit as exemplified in FIG. 3.

There a digital controller CD is shown coupled to a power converter CP comprising a rectifier arrangement of one or more SR FETs such as MOSFET transistors.

As noted, one or more embodiments may be applied to a wide variety of rectifier circuits adopting synchronous rectification.

For that reason, FIG. 3 refers for simplicity to a converter circuit block CP, which may include one or more rectification FETs whose $V_{DS}$ voltage can be sensed with current conduction in the FET channel controlled via a PWM signal applied to the FET gate. An example of such a converter circuit block CP is shown in FIG. 1B.

For the sake of simplicity, FIG. 3 refers to a single FET whose $V_{DS}$ voltage can be sensed via a conventional voltage sensor VS at a sense node 10 of the digital controller CD and where current conduction in the FET channel can be controlled via a PWM signal applied to the FET gate via a drive node 12 of the digital controller CD.

For the sake of explanation it will be assumed that a "high" state of the PWM signal is intended to cause the FET to be conductive (turned on) and that a "low" state of the PWM signal is intended to cause the FET to be non-conductive (turned off). Of course, adopting such an option is not mandatory.

FIG. 3 illustrates a (digital) comparator 14 in the controller CD where, as discussed in the following, the drain-source voltage $V_{DS}$ sensed at node 10 is compared with a reference value (e.g., $V_{TH\_ON\_OFF}$), with the result of comparison at 14 used to drive a PWM generator block 16 having an output coupled to the drive node 12 which controls (rectified) current flow ($I_{SR}$) in the FET channel.

In one or more embodiments, rising and falling edges of $V_{DS}$ at the comparator 14 (that is crossings of the threshold(s) of the comparator 14 by $V_{DS}$) can be used to trigger the PWM generator block 16 to generate at node 12 the PWM signal for driving a FET in the converter CP.

For instance, as exemplified in FIG. 2, when the voltage $V_{DS}$ decreases below the threshold of the comparator 14 (falling edge at the comparator output—see point A in FIG. 2—which is indicative of the body diode conducting), the PWM generation block 16 (which may comprise a timer) is triggered to generate a PWM signal, designated PWM_SR (e.g., "high"), after a programmed delay (turn-on delay TOD).

The signal PWM_SR is kept high for a minimum on-time (blanking window of the comparator BT) to avoid false triggers.

A result of $V_{DS}$ rising again above the threshold (rising edge at the comparator output—see point B in FIG. 2—which means that the body diode is going to be reverse biased), the comparator output triggers via the block 16 the shutdown of PWM signal PWM_SR (see FIG. 2, right hand side), at a comparator trigger time CT earlier with respect to a normal pulse duration NP of the PWM signal.

Intervals of body diode conduction at points A and B are indicated as DC (body diode conduction).

It will be appreciated that, in one or more embodiments, various options may be resorted to in order to facilitate this kind of operation.

For instance, a single comparator with a single threshold can be used with the comparator configured to trigger alternatively, PWM signal turn-on and turn-off. Hysteresis (possibly programmable) may be present and kept at a low level in order to facilitate switching at a desired threshold. Avoiding undesired abrupt switching may be facilitated by the Blanking window feature BT discussed previously.

Figure 7:
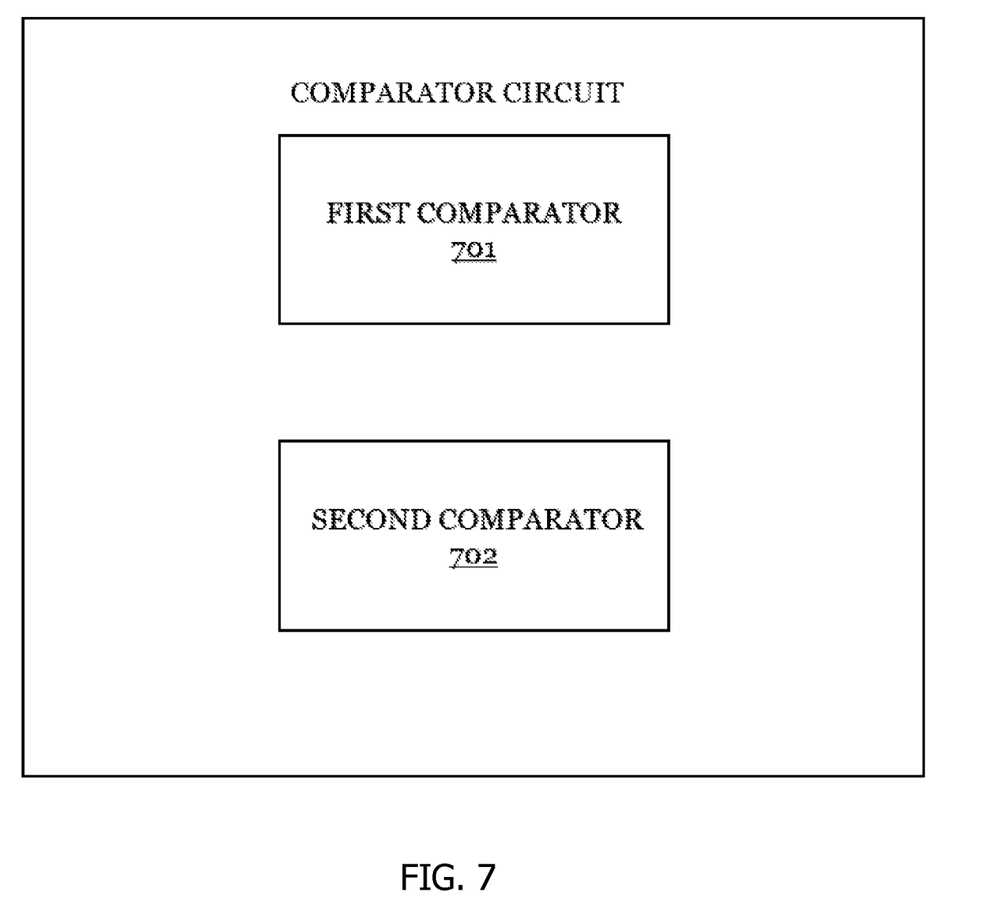
FIGS. 7 and 8 show embodiments of a comparator circuit.

As shown in FIG. 7, in one or more embodiments, two comparators 701, 702 with a single threshold may be used, so that the same threshold can be used for turn-on (triggered by a first comparator 701) and turn-off (triggered by a second comparator 702), so that no reconfiguration is required.

Figure 8:
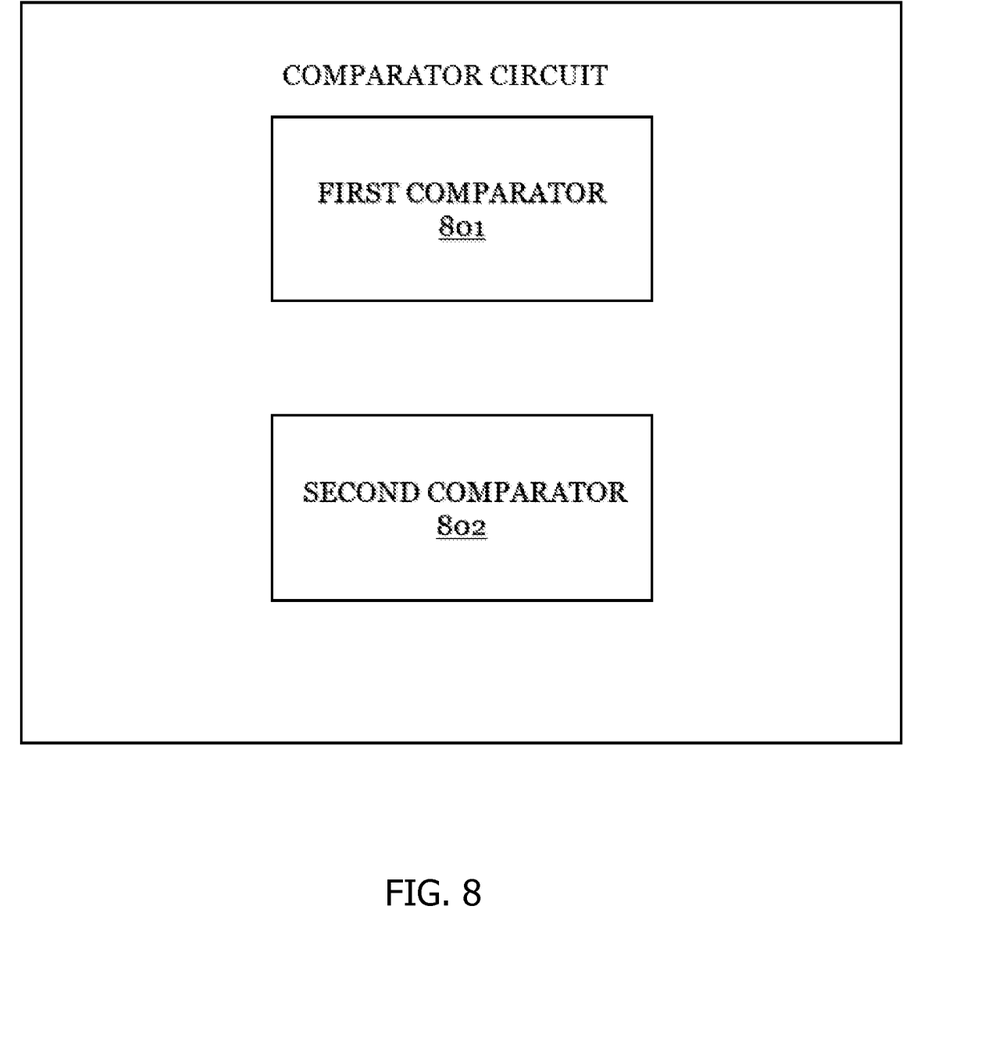

As shown in FIG. 8, in one or more embodiments, two comparators 801, 802 with two (different) thresholds may be used, so that a first threshold can be used for turn-on and a second (variable) threshold can be used for turn-off.

In this description of exemplary embodiments, a single (adaptive) threshold $V_{TH\_ON\_OFF}$ will be considered in order to make the presentation simpler and facilitate understanding of the embodiments.

Figure 4:
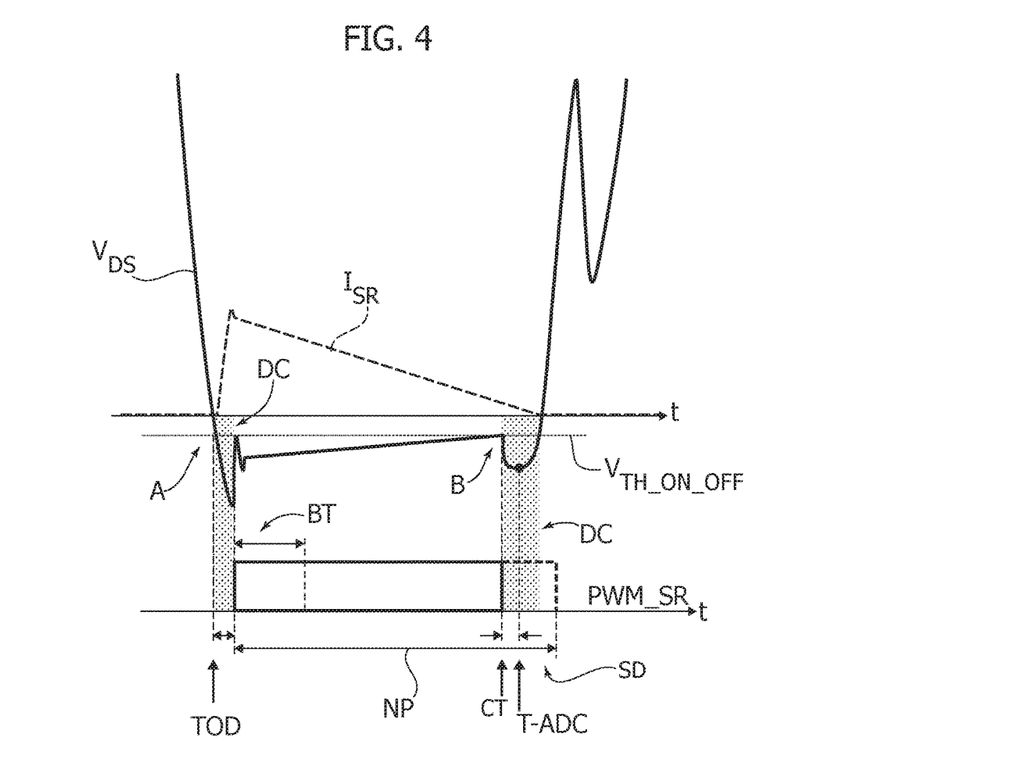
FIGS. 4 and 5 are further time diagrams exemplary of certain signals possibly involved in synchronous rectification with FETs.

FIG. 4—where entities like entities already discussed in connection with FIG. 2 are indicated with like references (a related description will not be repeated here for brevity)—shows that if the PWM signal PWM_SR is turned-off too early, a (still) positive current $I_{SR}$ through the FET will causes a non-negligible body diode conduction (DC, right hand side of FIG. 4). This implies low converter efficiency, so that the benefits of SR are at least partially lost.

Figure 5:
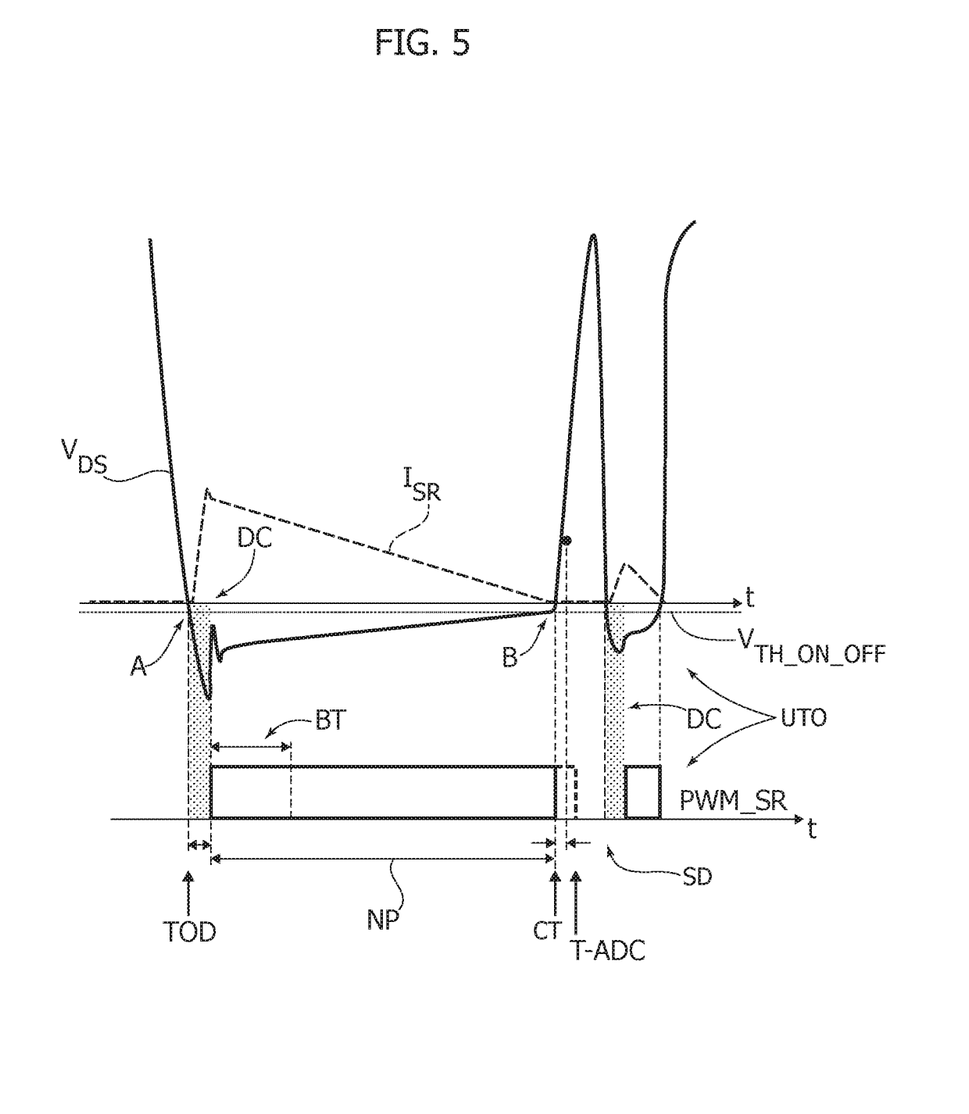

FIG. 5—where entities like entities already discussed in connection with FIGS. 2 and 4 are again indicated with like references (a related description will not be repeated here for brevity)—shows that if, conversely, the PWM signal PWM_SR is turned-off too late, the FET will be forced to conduct even with the diode reverse-biased (DC, right hand side of FIG. 5) and an ensuing negative current $I_{SR}$ can damage the MOSFET and cause its failure.

Moreover, after FET turn-off, a voltage ringing of $V_{DS}$ may force the body diode to conduct again, thus producing an undesired turn on: see UTO in FIG. 5). The comparator 14 may be triggered again to generate an undesired PWM signal PWM_SR (FIG. 5, bottom right) losing efficiency and keeping the FET on for a minimum "on" time.

One or more embodiments may thus adopt an adaptive SR control logic which facilitates reducing body diode conduction time by making the comparator threshold VTH_ON_OFF adaptive.

One or more embodiments may thus check if the threshold ($V_{TH\_ON\_OFF}$) of the comparator 14 is well tuned. This may occur by sampling the voltage $V_{DS}$ with a programmable sampling delay SD from PWM turn-off using the previous threshold value, and comparing it with a fixed value.

An analog-to-digital converter (ADC) channel can be used to sample the drain-to-source voltage Vds (for instance at times T-ADC in FIGS. 4 and 5) of the (MOS)FET after PWM turn-off (time indicated CT in FIGS. 4 and 5) and the synchronous rectification SR control logic can change the threshold(s) in the comparator 14 by using, for instance, an digital-to-analog converter or DAC channel.

The programmed delay facilitates achieving a condition where the (MOS)FET is completely turned-off because it can consider both turn-off delay and propagation delay introduced by gate drivers (both delays can be known and do not vary over time).

The value thus obtained being found to be below the preset threshold (see right hand side of FIG. 4) means that the MOSFET body diode is still conducting and the PWM is turned-off too early because the voltage drop on the MOSFET is equal to the forward voltage of body diode. In this case the threshold of the comparator 14 can be increased to achieve a later (delayed) MOSFET turn-off.

Otherwise, the acquired value being above the preset threshold (see right hand side of FIG. 5) suggests that MOSFET may have been "forced" to conduct even with a reverse current and the PWM is turned-off too late. This may be related to the fact that a small safe interval, in which the diode conducts (little notch in the $V_{DS}$ waveform), is not present and $V_{DS}$ rises (too) quickly. In this case the threshold of the comparator can be decreased to turn-off the MOSFET earlier.

The sampling delay from PWM turn-off (times CT in FIGS. 2, 4 and 5) gives also the time duration of this safe body diode conduction interval.

In the block diagram of FIG. 3, reference 18 denotes a circuit block which is triggered (via a line T) by a signal provided by the PWM generator 16 to provide a delayed acquisition of the signal $V_{DS}$ at the input node 10.

Reference 20 denotes an adaptive SR logic acting in cooperation with the delayed acquisition block 18 and with a circuit block 22 which controls (adaptively) the threshold(s) of the comparator 14.

In one or more embodiments, the threshold of the comparator 14 can be increased and decreased within an expected range [$COMP_{TH\ MIN}$; $COMP_{TH\ MAX}$] that depends on the characteristics of the sensing circuit and can be acquired with some measurements.

A small capacitor can be added in the sensing circuit VS to reduce the slope of $V_{DS}$ in sensing the associated waveform and obtain a better threshold regulation.

Figure 6:
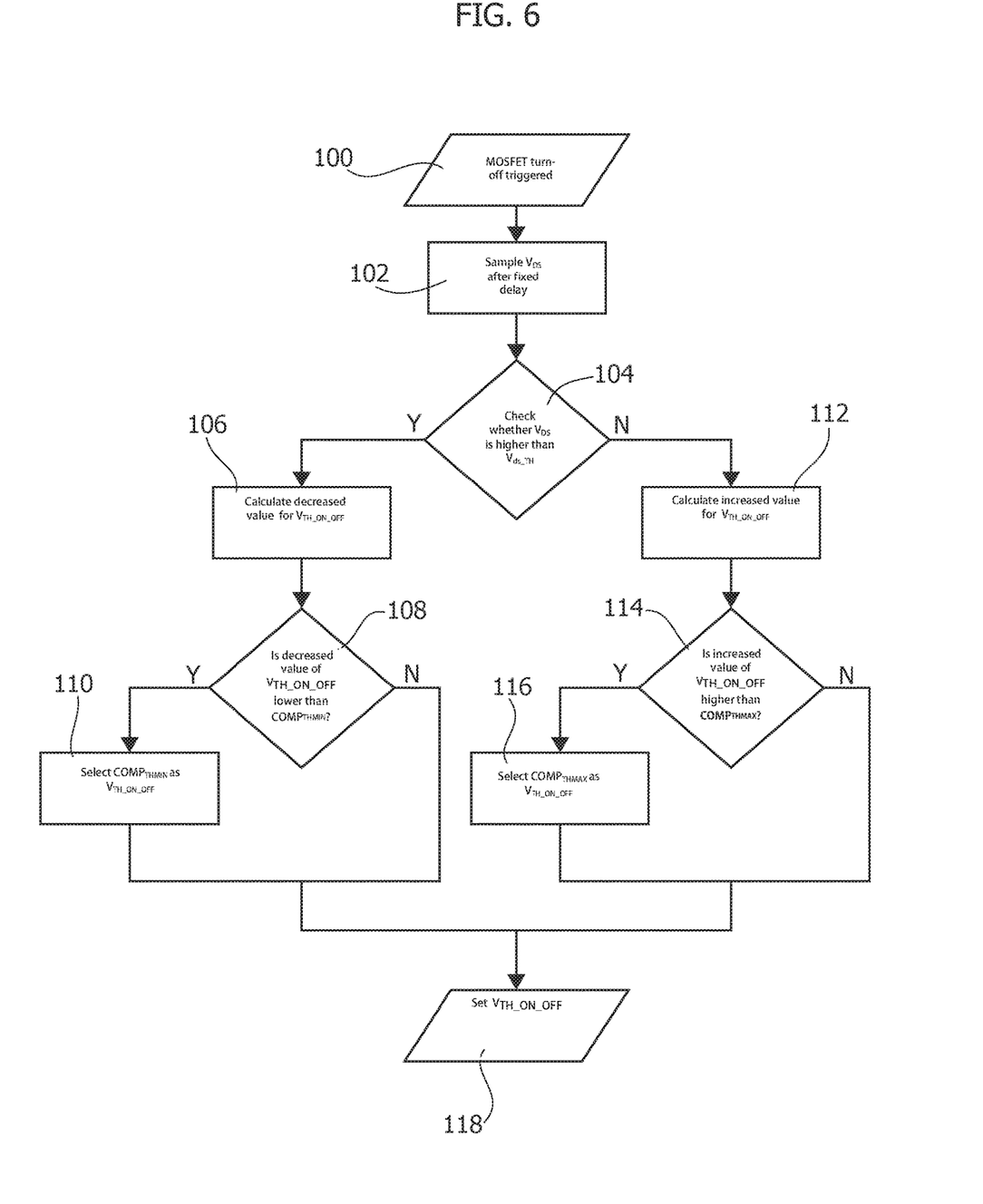
FIG. 6 is a flow chart exemplary of possible operation of embodiments.

The flowchart of FIG. 6 is exemplary of an adaptive synchronous rectification (SR) procedure which can be performed at each MOSFET turn-off or at a lower frequency (in this latter case, the comparator threshold(s) is/are kept constant over more PWM cycles).

The block 100 in the flow-chart of FIG. 6 is representative of MOSFET turn-off, triggered as a result of comparing, e.g., in the comparator 14, the (conditioned) sensed value for $V_{DS}$ with a "previous" threshold.

The block 102 is exemplary of $V_{DS}$ being sampled after a fixed delay (e.g., T-ADC) added to the FET turnoff time CT taken as starting time. This operation can occur in an automatic manner in a digital controller (for instance, a STM32 microcontroller as available with companies of the ST group) even without resorting to software instructions.

For instance (as a function of the type of controller) the possibility exists of adding a certain (predetermined) delay starting from an (external) event such as the comparator trigger to an internal timer of the controller.

The timer may be the same as used for generating the PWM signal (PWM generator block 16) in advanced microcontrollers (a so-called "autodelayed mode" in e.g., STM32F334).

Alternatively, one may use a further timer which starts counting at a trigger event (e.g., the falling edge of the PWM signal.

If the microcontroller does not include internal trigger connections one may use a further pin of the microcontroller coupled with the PWM signal and start the further timer at a falling edge (see, for instance the line T in FIG. 3).

As a result of the timer reaching a certain count value (that is, after T-ADC has lapsed), a (sampling) ADC is triggered.

In one or more embodiments the comparator trigger can be stored in a register in a timer (for instance, in the memory of the microcontroller).

With the measurement result received from the ADC triggered at a desired time, in a block 104 a check can be as to whether $V_{DS}$ as sampled is higher than a preset desired value, e.g., Vds_TH.

If the check at 104 yields a positive outcome (Y), a decreased value for the threshold (e.g., $V_{TH\_ON\_OFF}$) in the comparator 14 is calculated at 106 and a check is performed at 108 as to whether the value thus calculated (not yet set) is lower than a minimum respective value, e.g., $COMP_{TH\ MIN}$.

If the check at 108 yields a positive outcome (Y) the minimum value is selected for the comparator threshold(s).

If the check at 104 yields a negative outcome (N), an increased value for the threshold (e.g., $V_{TH\_ON\_OFF}$) in the comparator 14 is calculated at 112 and a check is performed at 114 as to whether the value thus calculated (not yet set) is higher than a maximum respective value, e.g., $COMP_{TH\ MAX}$.

If the check at 114 yields a positive outcome (Y) the maximum value is selected for the comparator threshold(s).

Starting from any of:
the block 110;
a negative outcome (N) of the check at 108;
the block 116;
a negative outcome (N) of the check at 114,
a (new) value for the threshold (e.g., $V_{TH\_ON\_OFF}$) of the comparator can be set at 118 as dictated by these previous acts.

In one or more embodiments, a circuit may comprise a controller (e.g., CD) configured for coupling to a field effect transistor (e.g., as included in CP in FIG. 3) having a field effect transistor channel between source and drain terminals as well as a body diode and a gate terminal configured to control electrical current flow in the field effect transistor channel. The controller may comprise a sensing port (e.g., 10), a comparator (e.g., 14), and a PWM signal generator (e.g., 16).

The sense terminal (e.g., node 10) is configured to sense (e.g., VS) the drain-to-source voltage (e.g., $V_{DS}$) of the field effect transistor as well as a drive terminal (e.g., node 12) configured to drive the gate terminal of the field effect transistor to alternatively turn the field effect transistor on and off to provide a rectified current flow in the field effect transistor channel.

The comparator (e.g., 14) is coupled to the sensing port. The comparator is configured to perform a comparison of the drain-to-source voltage of the field effect transistor with at least one reference threshold (e.g., $V_{TH\_ON\_OFF}$: as noted, a single threshold is discussed for simplicity) and detect alternate downward (e.g., A) and upward (e.g., B) crossings of the at least one reference threshold by the drain-to-source voltage.

The PWM signal generator (e.g., 16) is coupled to the comparator circuit and the drive terminal. The PWM signal generator is configured to drive (e.g., PWM_SR) the gate terminal of the field effect transistor to turn the field effect transistor on and off as a result of the alternate downward and upward crossings of the at least one reference threshold by the drain-to-source voltage.

In one or more embodiments, the PWM signal generator may be configured to turn the field effect transistor on with a certain delay (e.g., TOD) to the respective crossings of the at least one reference threshold by the drain-to-source voltage.

In one or more embodiments, the PWM signal generator may be configured to keep the field effect transistor turned on for on-time intervals in excess of a lower on-time threshold (e.g., BT).

One or more embodiments may comprise an acquisition circuit block (e.g., 18) and an adaptive network (e.g., 20, 22). The acquisition circuit block (e.g., 18) coupled (e.g., at T) to the PWM signal generator in the controller. The acquisition circuit block is sensitive to field effect transistor turn off times (e.g., CT), the acquisition circuit block coupled to the sensing port and configured to sense the drain-to-source voltage of the field effect transistor with a certain delay (e.g., T-ADC) to field effect transistor turn off times. The adaptive network (e.g., 20, 22) is coupled to the acquisition circuit block in the controller. The adaptive network is configured to control the field effect transistor turn off times as a function of the drain-to-source voltage of the field effect transistor sensed with a certain delay at the acquisition circuit block.

One or more embodiments may comprise the adaptive network configured to compare (e.g., 104 in FIG. 6) the drain-to-source voltage ($V_{DS}$) of the field effect transistor sensed with a certain delay (T-ADC) at the acquisition circuit block with an acquisition threshold value (for instance, $V_{DS\_TH}$) and cause the field effect transistor turn off times to occur later resp. earlier (e.g., due to a change in the threshold in the comparator 14) as a result of the drain-to-source voltage of the field effect transistor sensed with a certain delay at the acquisition circuit block being below resp. above the acquisition threshold value.

In one or more embodiments the adaptive network may be arranged intermediate the acquisition circuit block and the comparator, the adaptive network configured to vary (see, e.g., 100 to 118 in FIG. 6) the at least one reference threshold as a function of the drain-to-source voltage of the field effect transistor sensed with a certain delay at the acquisition circuit block.

In one or more embodiments, the controller may comprise a digital controller.

In one or more embodiments, a device such as, for instance, a converter for use in battery chargers for electronic devices, USB power delivery (USB-PD) arrangements, adapters and so on, may comprise a rectification network (e.g., T, L, C, F1, F2 in FIG. 1) comprising at least one field effect transistor having a field effect transistor channel between source and drain terminals as well as a body diode and a gate terminal configured to control electrical current flow in the field effect transistor channel. The device can also include a circuit according to one or more embodiments, having the sensing port coupled to the at least one field effect transistor and configured (e.g., VS) to sense the drain-to-source voltage of the at least one field effect transistor and the drive terminal coupled to the gate terminal of the at least one field effect transistor to alternatively turn the at least one field effect transistor on and off to provide a rectified current flow in the channel thereof.

In one or more embodiments, a method of driving a field effect transistor having a field effect transistor channel between source and drain terminals as well as a body diode and a gate terminal configured to control electrical current flow in the field effect transistor channel. The method may comprise sensing the drain-to-source voltage of the field effect transistor and driving the gate terminal of the field effect transistor to alternatively turn the field effect transistor on and off to provide a rectified current flow in the field effect transistor channel, performing a comparison of the drain-to-source voltage of the field effect transistor with at least one reference threshold and detecting alternate downward and upward crossings of the at least one reference threshold by the drain-to-source voltage, and driving the gate terminal of the field effect transistor by turning the field effect transistor on and off as a result of the alternate downward and upward crossings of the at least one reference threshold by the drain-to-source voltage.

Without prejudice to the underlying principles, the details and embodiments may vary, even significantly, with respect to what has been described by way of example only, without departing from the extent of protection.

The extent of protection is determined by the annexed claims.

What is claimed is:

1. A circuit configured to be coupled to a field effect transistor that has a channel between source and drain terminals as well as a body diode and a gate terminal configured to control electrical current flow in the field effect transistor channel, wherein the circuit comprises:
    a sense terminal configured to sense a drain-to-source voltage of the field effect transistor;
    a drive terminal configured to drive the gate terminal of the field effect transistor to alternatively turn the field effect transistor on and off to provide a rectified current flow in the field effect transistor channel;
    a comparator coupled to the sense terminal, the comparator configured to perform a comparison of the drain-to-source voltage of the field effect transistor with a reference threshold and to detect alternate downward and upward crossings of the reference threshold and the drain-to-source voltage; and
    a PWM signal generator coupled to the comparator and the drive terminal, the PWM signal generator configured to drive the gate terminal of the field effect transistor to turn the field effect transistor on and off as a result of the alternate downward and upward crossings of the reference threshold by the drain-to-source voltage.

2. The circuit of claim 1, wherein the PWM signal generator is configured to turn the field effect transistor on with a delay relative to the downward crossings of the reference threshold and the drain-to-source voltage.

3. The circuit of claim 1, wherein the PWM signal generator is configured to keep the field effect transistor turned on for on-time intervals in excess of a lower on-time threshold.

4. The circuit of claim 1, further comprising an acquisition circuit block coupled to the PWM signal generator, wherein the acquisition circuit block is sensitive to field effect transistor turn-off times, the acquisition circuit block coupled to the sense terminal and configured to sense the drain-to-source voltage of the field effect transistor with a delay relative to field effect transistor turn-off times.

5. The circuit of claim 4, further comprising an adaptive network coupled to the acquisition circuit block, the adaptive network configured to control the field effect transistor turn off times as a function of the drain-to-source voltage of the field effect transistor sensed with the delay at the acquisition circuit block.

6. The circuit of claim 5, wherein the adaptive network is configured to compare the drain-to-source voltage of the field effect transistor sensed with the delay at the acquisition circuit block with an acquisition threshold value to cause the field effect transistor turn off times to occur earlier as a result of the drain-to-source voltage of the field effect transistor sensed with the delay at the acquisition circuit block being above the acquisition threshold value.

7. The circuit of claim 5, wherein the adaptive network is configured to compare the drain-to-source voltage of the field effect transistor sensed with the delay at the acquisition circuit block with an acquisition threshold value to cause the field effect transistor turn off times to occur later as a result of the drain-to-source voltage of the field effect transistor sensed with the delay at the acquisition circuit block being below the acquisition threshold value.

8. The circuit of claim 5, wherein the adaptive network is arranged between the acquisition circuit block and the comparator, the adaptive network configured to vary the reference threshold as a function of the drain-to-source voltage of the field effect transistor sensed with the delay at the acquisition circuit block.

9. The circuit of claim 1, wherein the circuit operates as a digital controller.

10. A circuit comprising:
    a rectification circuit comprising a field effect transistor that has a channel between source and drain terminals and a gate terminal configured to control electrical current flow in the channel;
    a sense terminal configured to sense a drain-to-source voltage of the field effect transistor;
    a drive terminal coupled to the gate terminal of the field effect transistor to alternatively turn the field effect transistor on and off to provide a rectified current flow in the field effect transistor channel;
    a comparator circuit coupled to the sense terminal, the comparator circuit configured to perform a comparison of the drain-to-source voltage of the field effect transistor with a reference threshold and to detect alternate downward and upward crossings of the reference threshold and the drain-to-source voltage; and
    a PWM signal generator coupled to the gate terminal of the field effect transistor, the comparator circuit and the drive terminal, the PWM signal generator configured to drive the gate terminal of the field effect transistor to turn the field effect transistor on and off as a result of the alternate downward and upward crossings of the reference threshold by the drain-to-source voltage.

11. The circuit of claim 10, wherein the rectification circuit further comprises:
    a transformer having a first secondary winding terminal and a second secondary winding terminal, the first secondary winding terminal coupled to the source of the field effect transistor;
    an inductor having a first terminal and a second terminal, the first terminal of the inductor coupled to the drain of the field effect transistor; and
    a capacitor having a first terminal and a second terminal, the first terminal of the capacitor coupled to the second terminal of the inductor.

12. The circuit of claim 11, further comprising a second field effect transistor coupled to the transformer.

13. The circuit of claim 12, wherein the second field effect transistor has a source coupled to the second secondary winding terminal and the second terminal of the capacitor, the second field effect transistor also having a drain coupled to the drain of the field effect transistor and the first terminal of the inductor.

14. The circuit of claim 12, wherein the second field effect transistor has a source coupled to the second secondary winding terminal and a drain coupled to the drain of the field effect transistor and the first terminal of the inductor, wherein the second terminal of the capacitor is coupled to the source of the field effect transistor and to the first secondary winding terminal.

15. The circuit of claim 12, wherein the comparator circuit comprises a single comparator and the reference threshold comprises a single threshold.

16. The circuit of claim 12, wherein the reference threshold exhibits a hysteresis characteristic based on turning on and off of the field effect transistor.

17. The circuit of claim 12, wherein the comparator circuit comprises two comparators coupled to the reference threshold.

18. The circuit of claim 12, wherein the comparator circuit comprises first and second comparators, the first comparator coupled to the reference threshold and the second comparator coupled to a second reference threshold.

19. The circuit of claim 10, further comprising an acquisition circuit block coupled to the PWM signal generator, wherein the acquisition circuit block is sensitive to field effect transistor turn off times, the acquisition circuit block coupled to the sense terminal and configured to sense the drain-to-source voltage of the field effect transistor with a delay relative to field effect transistor turn off times.

20. The circuit of claim 19, further comprising an adaptive network coupled to the acquisition circuit block, the adaptive network configured to control the field effect transistor turn off times as a function of the drain-to-source voltage of the field effect transistor sensed with the delay at the acquisition circuit block.

21. A method of driving a field effect transistor that has a channel between source and drain terminals and a gate terminal that is configured to control electrical current flow in the field effect transistor channel, the method comprising:
   sensing a drain-to-source voltage of the field effect transistor;
   comparing a drain-to-source voltage of the field effect transistor with a reference threshold;
   detecting alternate downward and upward crossings of the reference threshold by the drain-to-source voltage; and
   driving the gate terminal of the field effect transistor with a PWM signal by turning the field effect transistor on and off as a result of the alternate downward and upward crossings of the reference threshold by the drain-to-source voltage, the driving causing a rectified current flow in the field effect transistor channel.

22. The method of claim 21, further comprising turning the field effect transistor on with a delay relative to the downward crossings of the reference threshold and the drain-to-source voltage.

23. The method of claim 21, wherein the PWM signal keeps the field effect transistor turned on for on-time intervals in excess of a lower on-time threshold.

24. The method of claim 21, further comprising sensing the drain-to-source voltage of the field effect transistor with a delay relative to field effect transistor turn off times.

25. The method of claim 24, further comprising controlling the field effect transistor turn off times as a function of the drain-to-source voltage of the field effect transistor sensed with the delay.

26. The method of claim 25, further comprising comparing the drain-to-source voltage of the field effect transistor sensed with the delay with an acquisition threshold value to cause the field effect transistor turn off times to occur earlier as a result of the drain-to-source voltage of the field effect transistor sensed with a delay being above the acquisition threshold value.

27. The method of claim 25, further comprising comparing the drain-to-source voltage of the field effect transistor sensed with the delay with an acquisition threshold value to cause the field effect transistor turn off times to occur later as a result of the drain-to-source voltage of the field effect transistor sensed with the delay being below the acquisition threshold value.

28. The method of claim 25, further comprising varying the reference threshold as a function of the drain-to-source voltage of the field effect transistor sensed with the delay.

29. The method of claim 21, wherein the method is performed as a digital controller.

* * * * *